(12) United States Patent
Mandal et al.

(10) Patent No.: US 11,068,495 B2
(45) Date of Patent: Jul. 20, 2021

(54) METHOD AND SYSTEM FOR INTEGRATING BUSINESS LOGIC DATABASE WITH HMI APPLICATION

(71) Applicant: WIPRO LIMITED, Bangalore (IN)

(72) Inventors: Swarup Mandal, Kolkata (IN); Debasish Chanda, Maheshtala (IN); Souvik Dutta, Kolkata (IN)

(73) Assignee: Wipro Limited, Bangalore (IN)

( * ) Notice: Subject to any disclaimer, the term of this patent is extended or adjusted under 35 U.S.C. 154(b) by 252 days.

(21) Appl. No.: 15/941,014

(22) Filed: Mar. 30, 2018

(65) Prior Publication Data

US 2019/0251185 A1  Aug. 15, 2019

(30) Foreign Application Priority Data

Feb. 15, 2018 (IN) .............................. 201841005780

(51) Int. Cl.
  *G06F 16/25* (2019.01)
  *G06F 16/21* (2019.01)
  *G06F 16/23* (2019.01)

(52) U.S. Cl.
  CPC .......... *G06F 16/252* (2019.01); *G06F 16/212* (2019.01); *G06F 16/2379* (2019.01)

(58) Field of Classification Search
  CPC .................................................. G06F 16/252
  See application file for complete search history.

(56) References Cited

U.S. PATENT DOCUMENTS

| | | | | |
|---|---|---|---|---|
| 6,505,247 B1* | 1/2003 | Steger | ................... | G05B 19/00 700/9 |
| 2004/0187140 A1* | 9/2004 | Aigner | ...................... | G06F 8/20 719/328 |
| 2006/0235548 A1* | 10/2006 | Gaudette | ................... | G06F 8/34 700/83 |
| 2008/0092131 A1* | 4/2008 | McIntyre | ................ | G06F 9/451 717/172 |
| 2008/0189637 A1* | 8/2008 | Krajewski | ................. | G06F 8/36 715/771 |

(Continued)

OTHER PUBLICATIONS

Fillyaw et al., "Testing Human Machine Interface (HMI) Rich Designs using Model-Based Design", 2008 (Year: 2008).*

(Continued)

*Primary Examiner* — Dawaune A Conyers
(74) *Attorney, Agent, or Firm* — Finnegan, Henderson, Farabow, Garrett & Dunner, LLP

(57) ABSTRACT

The present disclosure discloses a method and system for integrating a dynamic Business Logic (BL) Database (DB) with a Human Machine Interface (HMI) application. The method comprises receiving a Business Logic (BL) specification. The BL specification comprises BL data and one or more parameters associated with the BL data. Further, one or more state charts of the BL data are generated from the BL specification. Thereafter, a dynamic BL DB is developed based on the one or more parameters and the one or more state charts. Furthermore, the BL data in the dynamic BL DB is updated when the BL data in the BL specification is updated. Lastly, the dynamic BL DB is integrated with a HMI application utilizing the BL data to implement the BL. The HMI application retrieves the updated BL data from the dynamic BL DB for implementing updated BL.

18 Claims, 8 Drawing Sheets

(56) References Cited

U.S. PATENT DOCUMENTS

2015/0058267 A1 2/2015 Kim
2017/0013064 A1* 1/2017 Knight .................... H04L 67/14
2017/0083290 A1* 3/2017 Bharthulwar ............. G06F 8/20

OTHER PUBLICATIONS

Sharma et al., "Towards Model Driven Testing of Human Machine Interface Framework for In-vehicle Infotainment Platforms", 2008 (Year: 2008).*
"Use a Single Software Tool for HMI and Logic Programming", (2017), *National Instruments*, http://www.ni.com/newsletter/50127/en/, pp. 1-3.
"Harman Automated IU Development Suite for Automotive", (2015), *Harman International Industries, Incorporated*, pp. 1-2.

* cited by examiner

| State Name | <State Name> | | |
|---|---|---|---|
| State Function ||||
| Type | Name | Parameter ||
| Entry | <Entry Func> | <Param1>:<Value1>; <Param2>:<Value2> ||
| Do | <Do Func> | <Param1>:<Value1>; <Param2>:<Value2> ||
| Exit | <Exit Func> | <Param1>:<Value1>; <Param2>:<Value2> ||
| Transition ||||
| Trigger1 | <Guard11> | <Action11> | <Next State> |
|  | <Guard12> | <Action12> | <Next State> |
|  | ... | ... | ... |
|  | <Guard1N> | <Action1N> | <Next State> |
| Trigger2 | <Guard21> | <Action21> | <Next State> |
|  | <Guard22> | <Action22> | <Next State> |
|  | ... | ... | ... |
|  | <Guard2N> | <Action2N> | <Next State> |
| ... | ... | ... | ... |
| TriggerM | <GuardM1> | <ActionM1> | <Next State> |
|  | <GuardM2> | <ActionM2> | <Next State> |
|  | ... | ... | ... |
|  | <GuardMN> | <ActionMN> | <Next State> |

FIGURE 4B

METHOD AND SYSTEM FOR INTEGRATING BUSINESS LOGIC DATABASE WITH HMI APPLICATION

TECHNICAL FIELD

The present disclosure relates to Human Machine Interface (HMI). More specifically, but not exclusively, the present disclosure relates to a method and a system for integrating a business logic database with a HMI application.

BACKGROUND

Many applications interact with humans with the help of Human Machine interface (HMI). HMI development for an application is based on user interface required for the application and a business logic. The user interface is also referred as a scene. During the development cycle of the application, the business logic may be changed. Hence, the HMI should be changed according to changes in the business logic.

In the existing HMI applications, when the business logic is changed, the entire HMI application has to be changed. Thus, to achieve productivity, the business logic has to be finalized before developing the HMI application. Likewise, when user interface is changed, the business logic has to be updated. In few circumstances, the changes required in the business logic is noticed only when the HMI is developed. Thus, a compromise has to be made to choose either to develop the business logic initially to avoid changing the HMI, or to change the HMI according to changes in the business logic. Further, the development of HMI and business logic incurs huge amount of resources. Also, plenty of risks are involved while finalizing the business logic before the HMI development. Thus, the existing systems do not provide proficient system.

The information disclosed in this background of the disclosure section is only for enhancement of understanding of the general background of the invention and should not be taken as an acknowledgement or any form of suggestion that this information forms the prior art already known to a person skilled in the art.

SUMMARY

In an embodiment, the present disclosure discloses a method for integrating a dynamic Business Logic (BL) Database (DB) with a Human Machine Interface (HMI) application. The method comprises receiving, by a Database (DB) development tool, a Business Logic (BL) specification from one or more BL input sources. The BL specification comprises BL data and one or more parameters associated with the BL data. Further, the method comprises generating one or more state charts of the BL data from the BL specification. Thereafter, the method comprises developing a dynamic BL DB based on the one or more parameters and the one or more state charts. Thus, the dynamic BL DB comprises the BL data of the BL specification. Furthermore, the method comprises updating the BL data in the dynamic BL DB when the BL data in the BL specification is updated. Lastly, the method comprises integrating the dynamic BL DB with a HMI application utilizing the BL data to implement the BL The HMI application retrieves the updated BL data from the dynamic BL DB for implementing updated BL.

In an embodiment, the present disclosure discloses a dynamic Business Logic (BL) Database (DB) development tool for integrating with a Human Machine Interface (HMI) application. The dynamic BL DB comprises a processor and a memory. The processor is configured to receive a Business Logic (BL) specification from one or more BL input sources. The BL specification comprises BL data and one or more parameters associated with the BL data. The processor then generates one or more state charts of the BL data from the BL specification. Furthermore, the processor develops a dynamic BL DB based on the one or more parameters and the one or more state charts. Thus, the dynamic BL DB comprises the BL data of the BL specification. Thereafter, the processor updates the BL data in the dynamic BL DB when the BL data in the BL specification is updated. Lastly, the processor integrates the dynamic BL DB with a HMI application utilizing the BL data to implement the BL. The HMI application retrieves the updated BL data from the dynamic BL DB tier implementing updated BL.

In an embodiment, the present invention relates to a non-transitory computer readable medium including instructions stored thereon that when processed by at least one processor cause a device to perform operations comprising receiving a Business Logic (BL) specification from one or more BL input sources. The BL specification comprises BL data and one or more parameters associated with the BL data. Further, the media comprises generating one or more state charts of the BL data from the BL specification. Thereafter, the media comprises developing a dynamic BL DB based on the one or more parameters and the one or more state charts. Thus, the dynamic BL DB comprises the BL data of the BL specification. Furthermore, the media comprises updating the BL data in the dynamic BL DB when the BL data in the BL specification is updated. Lastly, the media comprises integrating the dynamic BL DB with a HMI application utilizing the BL data to implement the BL. The HMI application retrieves the updated BL data from the dynamic BL DB for implementing updated BL.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The novel features and characteristic of the disclosure are set forth in the appended claims. The disclosure itself, however, as well as a preferred mode of use, further objectives and advantages thereof, will best be understood by reference to the following detailed description of an illustrative embodiment when read in conjunction with the accompanying figures. One or more embodiments are now described, by way of example only, with reference to the accompanying figures wherein like reference numerals represent like elements and in which:

FIG. 4B shows an exemplary table for generating a business logic database, in accordance with some embodiments of the present disclosure;

Figure 1:
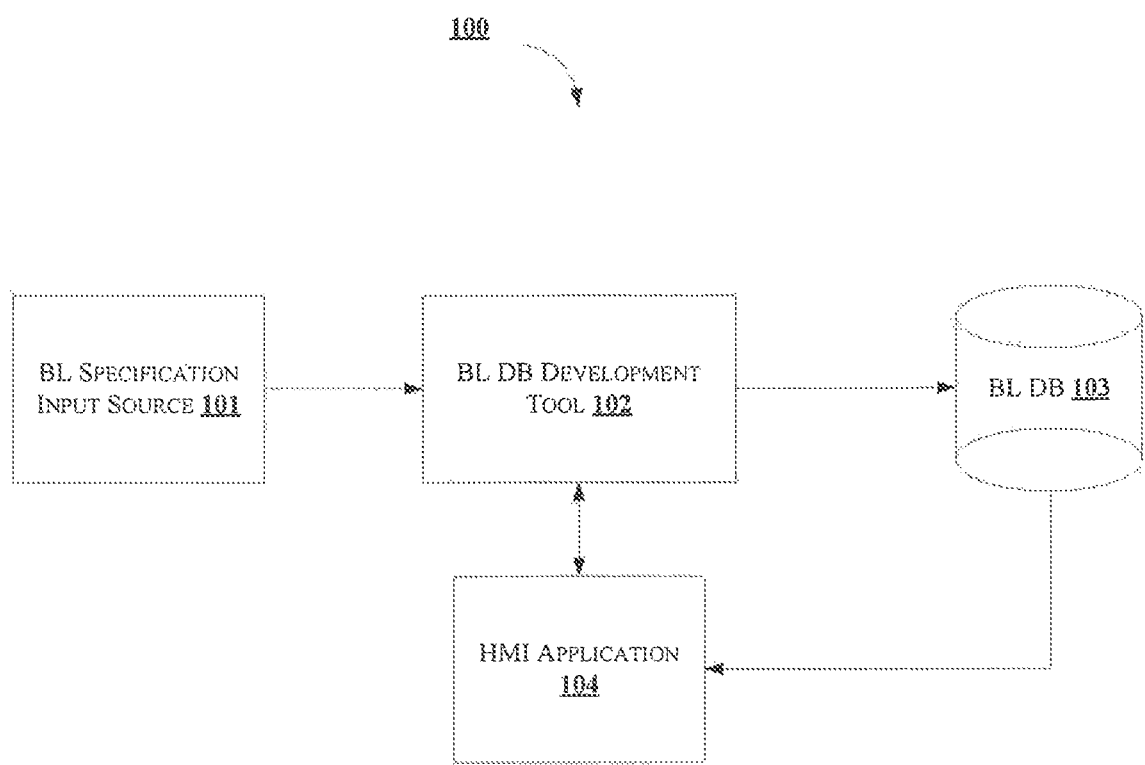
FIG. 1 is illustrative of an environment for developing a business logic database for integrating with a Human Machine Interface (HMI) application, in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method in other words, one or more elements in a system or apparatus proceeded by "comprises . . . a" does not, without more constraints, preclude the existence of other elements or additional elements in the system or apparatus.

Embodiments of the present disclosure relate to method and system for integrating a Business Logic (BL) Database (DB) with a Human Machine Interface (HMI). The system receives a BL specification from a BL input source. Then the system generates one or more state charts of the BL based on the BL specification. A BL editor is then used to generate a BL DB from the one or more state charts of the BL. Further, the system integrates the BL DB with a Human Machine Interface (HMI). When the BL specification is updated, the BL DB is also updated corresponding to the updated BL specification. Further, the system integrates the updated BL DB with the HMI application. Thus, the HMI application may not be developed with the updated BL specification, when the BL is updated in the BL specification. Instead, the system integrates only the updated BL with the HMI application when the BL specification is updated.

FIG. 1 illustrates an environment 100 for developing a Business Logic (BL) Database (DB) for integrating with a Human Machine Interface (HMI) application, in accordance with some embodiments of the present disclosure. The environment 100 may comprise a BL specification input source 101, a BL DB development tool 102, a BL DB 103 and a HMI application 104. The BL specification input source 101 may comprise the BL specification. The BL specification may comprise details regarding the BL required for the HMI application 104. The BL may comprise a logic of the HMI application 104 and a logic of a view of the HMI application 104. The logic of the HMI application 104 may define an interaction with a user using the HMI application 104 (for example, a logic for a user to change volume of an infotainment system). The logic of the view may define start-up procedure of the HMI application 104, and progression and prioritization of the animations in the HMI application 104 (for example, an animation to show increase in volume). In an embodiment, the BL specification input source 101 may be any source capable of provisioning a BL specification in at least one of a text format, a Visio™ format, and the like. In an embodiment, the BL specification source 101 may be an Original Equipment Manufacturer (OEM). In an embodiment, the BL specification input source 101 may be any computing device or a user. The BL specification may be provided to the BL DB development tool 102 in a BL specification format. Alternatively, the BL specification may be provided in a textual format (text present in a paper). In such scenario, the textual format may have to be converted to the BL specification format either manually or using a dedicated tool (not shown in figure). The BL specification may comprise BL data and one or more parameters associated with the BL data. The BL data may be data related to the logic of the view and the logic of the HMI application 104.

The BL DB development tool 102 may receive the BL specification from the BL specification input source 101. The BL DB development tool 102 may receive the BL specification from the BL specification input source 101 through one of a wired interface or a wireless interface. Further, the BL DB development tool 102 may develop the BL DB 103 based on the BL specification. When the BL data in the BL specification may be updated, the BL DB development tool 102 may update the BL DB 103 with the updated BL data. The BL DB development tool 102 may use a query language to interact with the BL DB 103. The query language may comprise one or more queries. The one or more queries may indicate an action to be performed on the BL DB 103. The BL DB development tool 102 may be associated with the BL DB 103 through one of a wired interface or a wireless interface.

In an embodiment, the BL DB development tool 102 may integrate the BL DB 103 with the HMI application 104. The HMI application 104 may use the BL data in the BL DB 103 for implementing the BL. The HMI application 104 may be a user interface that is used by a user. The HMI application 104 may have a view (visible interface to the user). The view may facilitate the HMI application 104 to provide various services to the user. For example, in an infotainment system, when the user chooses a radio option, the HMI application 104 present in the infotainment system may provide the user with options to choose a frequency from a range of frequencies. Each service may be triggered by the user or by the HMI application 104 itself. In the example described, the user triggers a radio service. The HMI application 104 triggers the service of displaying available radio frequencies to the user. Thus, the logic of displaying available radio frequencies when the user requests the radio service may be defined in the BL data. Likewise, various use cases may be defined in the BL data. Hence, the BL data may be dependent on the view of the HMI application 104. The BL DB development tool 102 may configure the BL DB 103 to provide the HMI application 104 with the updated BL data when the BL specification is updated. Thus, the HMI application 104 having a predefined view may be integrated with the BL data, even when the BL data in the BL specification may be updated. Thus, the BL DB development tool 102 may help in de-coupling the view and the BL, thereby creating a robust and independent environment 100.

Figure 2:
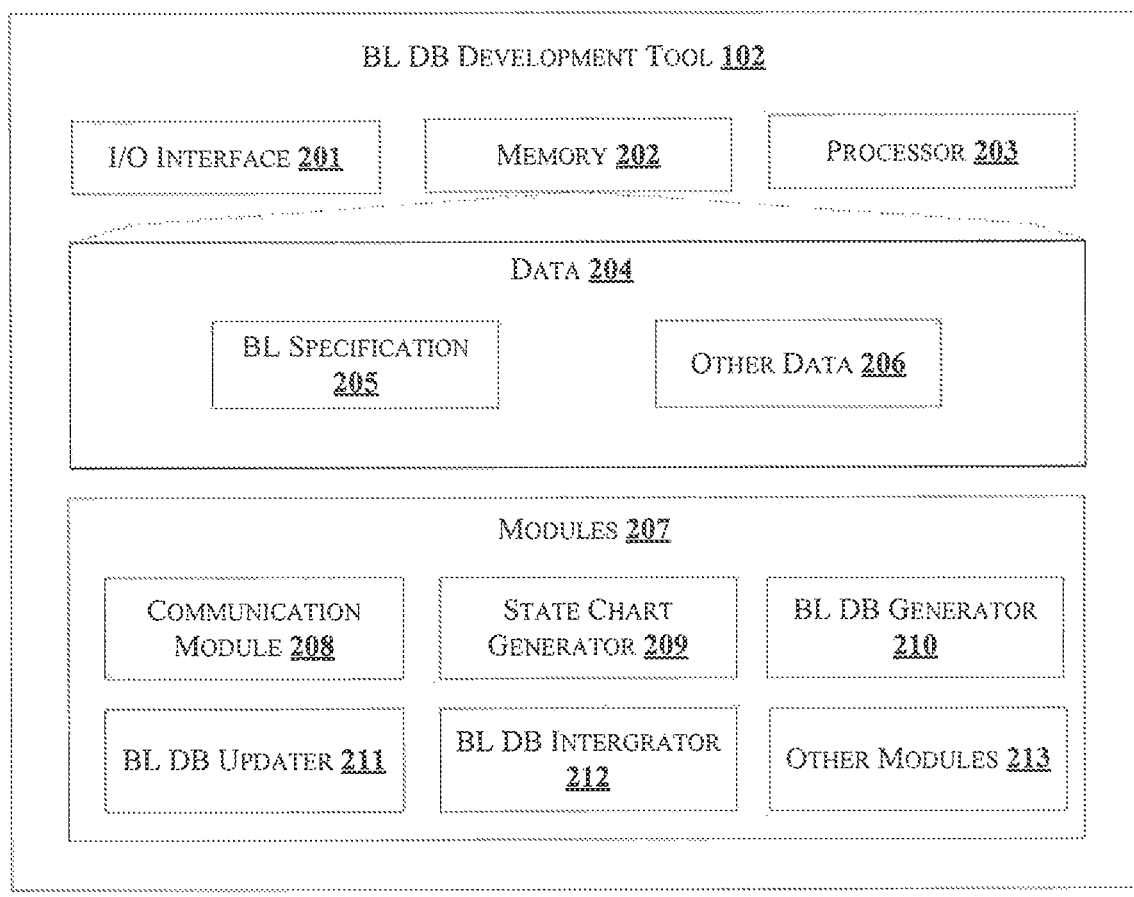
FIG. 2 shows an exemplary block diagram of internal architecture of a business logic database development tool, in accordance with some embodiments of the present disclosure.

FIG. 2 illustrates internal architecture of the BL DB development tool 102 in accordance with some embodiments of the present disclosure. The BL DB development tool 102 may include at least one Central Processing Unit ("CPU" or "processor") 203 and a memory 202 storing instructions executable by the at least one processor 203. The processor 203 may comprise at least one data processor for executing program components for executing user or system-generated requests. The memory 202 may be communicatively coupled to the processor 203. The BL DB development tool 102 may further comprise an Input/Output (I/O) interface 201. The I/O interface 201 may be coupled with the processor 203 through which an input signal or/and an output signal is communicated.

In an embodiment, data 204 may be stored within the memory 202. The data 204 may include, for example, BL specification 205 and other data. The BL specification 205 may include the BL data and the one or more parameters associated with the BL data. The BL data may include, but is not limited to, the logic of the HMI application 104 and the logic of the view. The one or more parameters may include, but is not limited to, behaviour of the HMI application 104 based on events triggered by the user or the BL DB development tool 102, cost associated in implementing the BL, and complexity in implementing the BL.

In an embodiment, the other data 206 may include, but is not limited to, information about HMI application 104 supporting the BL specification 205, database requirements for implementing the BL DB 103 and the like.

In an embodiment, the data 204 in the memory 202 may be processed by modules 207 of the BL DB development tool 102. As used herein, the term module refers to an Application Specific Integrated Circuit (ASIC), an electronic circuit, a Field-Programmable Gate Arrays (FPGA), Programmable System-on-Chip (PSoC), a combinational logic circuit, and/or other suitable components that provide, the described functionality. The modules 207 when configured with the functionality defined in the present disclosure will result in a novel hardware.

In one implementation, the modules 207 may include, for example, a communication module 203, a state chart generator 209, a BL DB generator 210, a BL DB updater 211, a BL DB integrator 212 and other modules 213. It will be appreciated that such aforementioned modules 207 may be represented as a single module or a combination of different modules.

In an embodiment, the communication module 208 may receive the BL specification 205 from the BL specification input source 101. The communication module 208 may interact with the HMI application 104, When the BL DB 103 may be updated, the HMI application 104 may retrieve only the updated BL data from the BL DB 103. When the BL DB 103 may be updated, the communication module 208 may indicate the HMI application 104 of such updates. In an embodiment, the communication module 208 may indicate the HMI application 104 regarding the updates of the BL DB 103 at predefined time intervals.

In an embodiment, the state chart generator 209 may generate one or more state charts based on the BL specification 205. The one or more state charts may be generated using a modelling tool. Any modelling tool may be used for generating the one or more state charts. Each of the one or more state charts comprises a plurality of state transitions. The plurality of state transitions may indicate the implementation of the BL. When the BL data is updated, the plurality of transitions may be updated accordingly. A transition may occur when one of a user or the BL DB development tool 102 generates a trigger. The trigger may be an indication for changing from a first state to a second state.

In an embodiment, the BL DB generator 210 may generate the BL DB 103 using the one or more state charts. The BL DB generator 210 may represent the one or more state charts in a table format and thereafter generate one or more queries to generate a corresponding table in the BL DB 103.

In an embodiment, the BL DB updater 211 may update the table in the BL DB 103 using the one or more queries. The one or more queries may indicate an action performed on the BL DB 103. The action may be one of an entry function, an exit function, a do function, and a transition function. Each action is used to keep the BL DB 103 updated.

In an embodiment, BL DB integrator 212 may integrate the BL DB 103 with the HMI application 104. The BL DB 103 may be integrated with the HMI application 104 so that the HMI application 104 may implement the BL present in the BL DB 103. When the user performs an action using the HMI application 104, the underlying BL may be initiated to respond to the user. Thus, the HMI application 104 may be integrated with the BL, Further, when the BL data in the BL specification 205 is updated, a corresponding update may be made in the one or more state charts and a corresponding update is reflected in the BL DB 103. As the BL may be de-coupled from the HMI application 104, and is integrated with the HMI application 104, the updated BL data may be retrieved by the HMI application 104 as and when required. Thus, the view of the HMI application 104 may not be changed every time the BL data is updated. The integration of the BL DB 103 with the HMI application 104 may enable de-coupling the BL from the HMI application 104.

In an embodiment, the other modules 213 may include, but are not limited to, a notification module, BL specification format generator, a query generator, and the like. The notification module may provide a notification to the HMI application 104 whenever the BL DB 103 is updated. Thus, BL specification format generator may convert the BL specification 205 to the specified format. The query generator may generate a set of queries based on the user input in the HMI application 104. For example, in an infotainment system, when the user requests for radio service, the query generator may generate a query to retrieve all the radio frequencies available to be displayed to the user.

Figure 3:
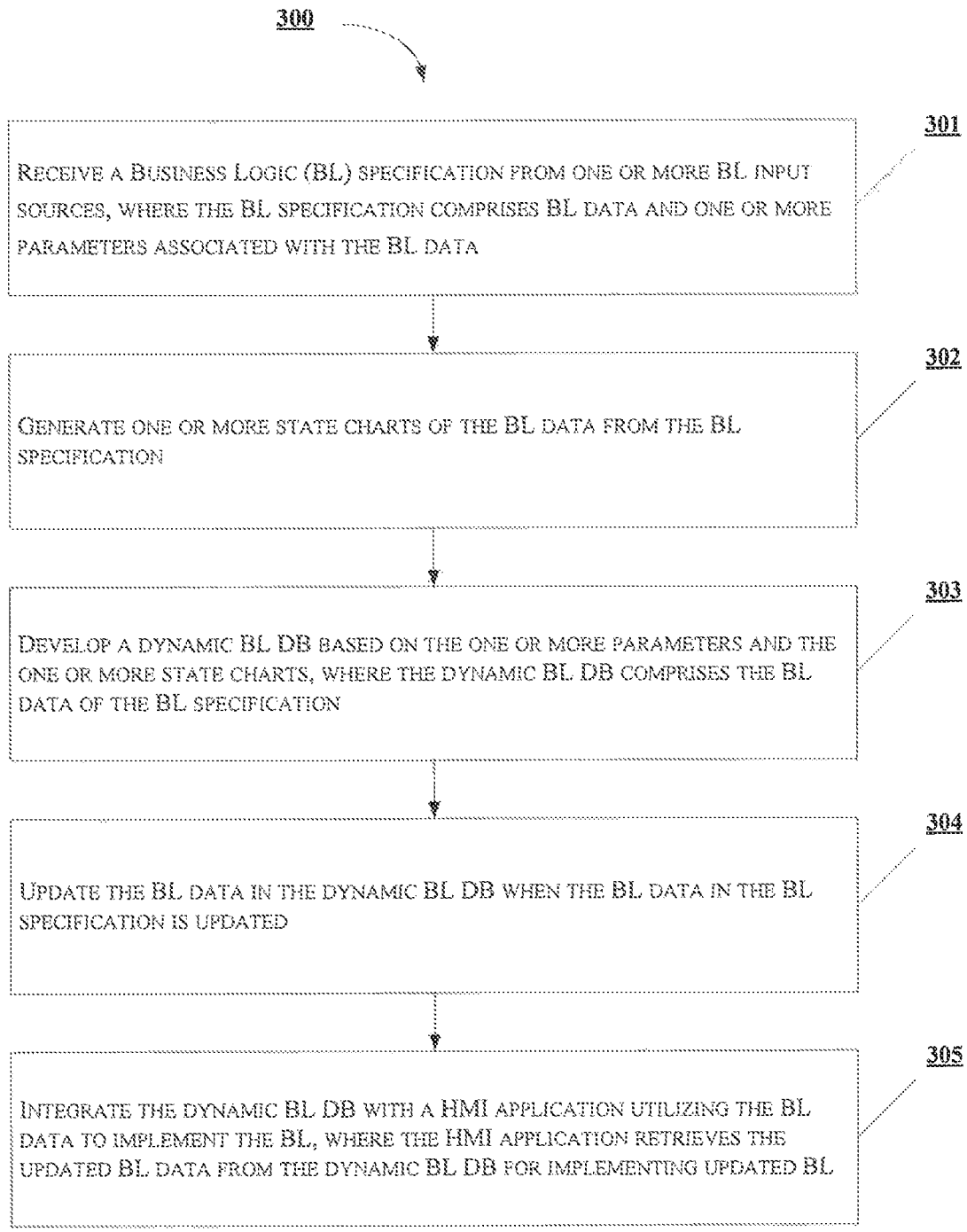
FIG. 3 shows an exemplary flow chart illustrating method steps for integrating a business logic database with a Human Machine Interface (HMI) application, in accordance with some embodiments of the present disclosure.

FIG. 3 shows a flow chart illustrating a method for integrating the BL DB 103 with the HMI application 104, in accordance with some embodiments of the present disclosure.

As illustrated in FIG. 3, the method 300 may comprise one or more steps for integrating the BL DB 103 with the HMI application 104, in accordance with some embodiments of the present disclosure. The method 300 may be described in the general context of computer executable instructions. Generally, computer executable instructions can include routines, programs, objects, components, data structures, procedures, modules, and functions, which perform particular functions or implement particular abstract data types.

The order in which the method 300 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At step 301, the communication module 208 may receive the BL specification 205 from the BL specification input source 101. The BL specification 205 may comprise the BL data and the one or more parameters associated with the BL data. In an embodiment, the communication module 208 may receive the BL specification 205 in the BL specification format. In an embodiment, the BL specification format generator may convert the BL specification 205 to the BL specification format when the BL specification 205 is not received in the BL specification format. The BL specification 205 may be provided by the OEM. The OEM may provide the BL specification 205 in a hand-written format. The BL specification format generator may convert the BL specification 205 to the BL specification format. One example of the BL specification format is a Portable Device Format (PDF). In an embodiment, any other BL specification format may be used. Another example of the BL specification format is a Visio™ diagram.

Figure 4A:
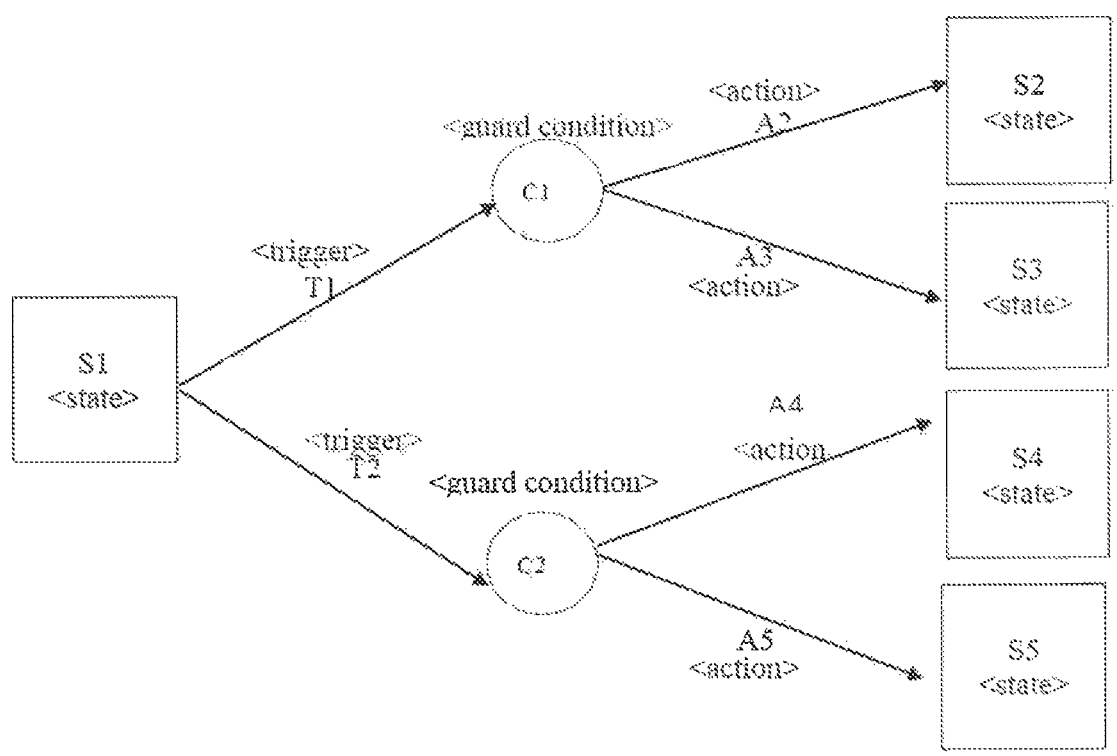
FIG. 4A shows an exemplary state chart diagram for generating a business logic database, in accordance with some embodiments of the present disclosure.

At step 302, the state chart generator 209 may generate the one or more state charts based on the BL specification 205. The one or more state charts represent the BL by way of plurality of state transitions. Consider a first state, a second state and a third state. Let us consider that the state chart represents the first state as an ideal state of an infotainment system. Let us consider that a transition from the first state to the second state represents a change of ideal state to a radio state. Likewise, a transition from the first state to the third state represents a change from the ideal state to a visual system state. The transitions from one state to another may be defined in the BL data. FIG. 4A, represents an exemplary diagram of a state chart. As shown in the FIG. 4A, the state chart may comprise one or more states and transition from one state to another state. FIG. 4A shows one state chart. Likewise, one or more state charts may be used to implement the BL data. The states are represented as S1, S2, S3, S4 and S5. A guard condition is present between any transition from one state to another state. The guard conditions are represented as C1 and C2. Guard conditions may be Boolean expressions evaluated dynamically based on state variables and event parameters. Guard conditions may affect the behavior of a state by enabling actions or transitions only based on predefined conditions. The actions may include at least one of an entry function, an exit function, a transition function and a do function. In an embodiment, the entry function is executed when a transition occurs from one state to another state. In an embodiment, the do function may be executed when a continuous process is performed on a current state. In an embodiment, the exit function may be executed on a state when a transition occurs from the state to another state. In an embodiment, the transition function may comprise a guard condition, an action function and a next state, for every trigger initiated.

FIG. 4B represents a table format of the state chart. The table format of the state chart may be used for generating the BL DB 103 from the state chart. The table format of the state chart may be used for developing a similar table in the BL DB 103.

Figure 4C:
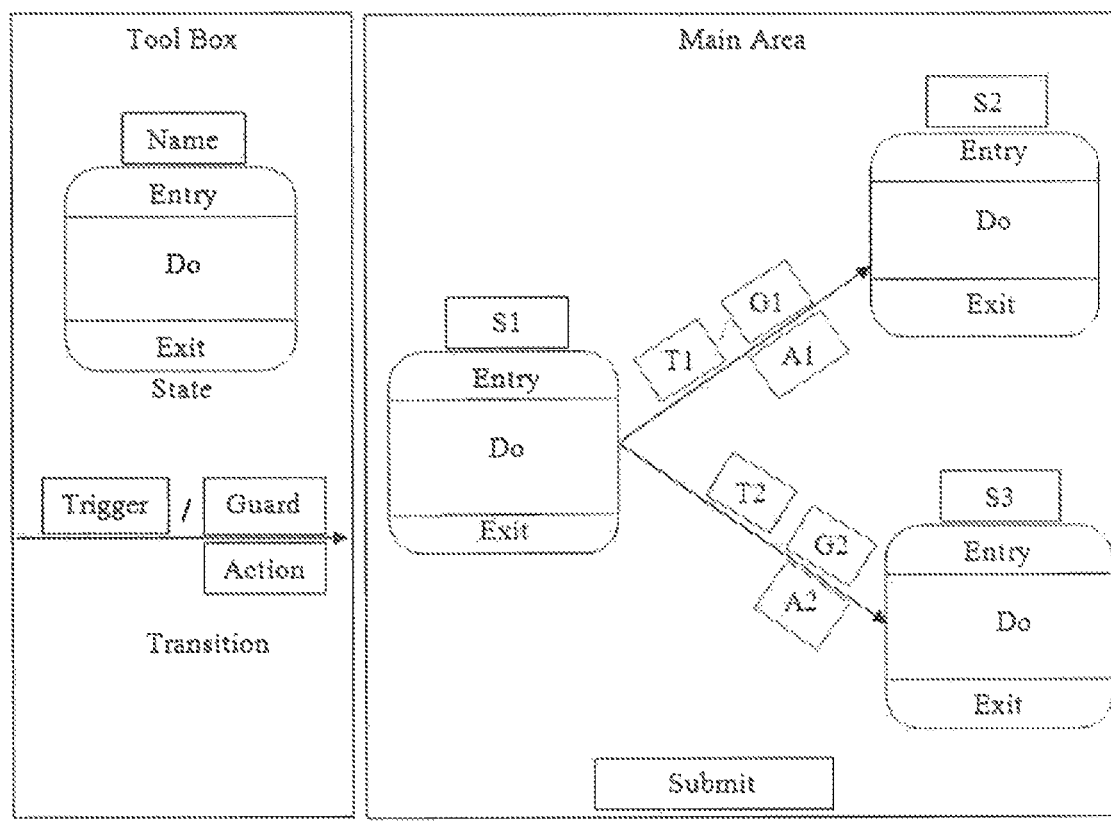
FIG. 4C shows an exemplary business logic development editor for developing a business logic database, in accordance with some embodiments of the present disclosure.

Referring back to FIG. 3, at step 303, the BL DB generator 210 may generate the BL DB 103 based on the table format of the state chart. In an embodiment, the BL DB generator 210 may be alternatively used as BL editor in the present disclosure. The generation of the BL DB 103 from the table format of the state chart is represented in FIG. 4C. As shown in the FIG. 4C, the BL editor 210 may comprise a tool box indicating the one or more states, actions, and transitions. The BL editor 210 may also comprise a main area where various functions from the tool box may be used. The functions from the tool box are used in the main area according to the BL data defined in the BL specification 205.

Referring back to FIG. 3, at step 304, the BL DB updater 211 may update the BL DB 103 when the BL data in the BL specification 205 is updated. In an embodiment, the BL DB updater 211 may use the BL editor 210 to update the BL DB 103. The BL DB updater 211 may use the query language to communicate with the BL DB 103.

At step 305, the BL DB integrator 212 may integrate the BL DB 103 with the HMI application 104. In an embodiment, the integration of the BL DB 103 with the HMI application 104 may comprise event translation, business function implementation and state controller generation.

In an embodiment, an event may be translated based on user-initiated event or the HMI application 104 initiated event. In an embodiment, the HMI application 104 initiated events may be received by the BL DB development tool 102 through a Service Access Layer (SAL) interface. Both the user-initiated event and the HMI application 104 initiated event may be mapped to determine the state changes in the one or more state charts.

In an embodiment, the business function implementation may be performed using the guard function, the action function and a state function. The guard function may be implemented using a platform interface that may use data from a data pool associated with the HMI application 104, Likewise, the action function may be implemented using the platform interface that may use data from the data pool. In an embodiment, the state function is implemented for any state specific business function that may be used for at least one of the entry function, the do function and the exit function.

In an embodiment, an Interface Definition File (IDF) may be created to de-couple the HMI application 104 from the BL DB 103.

In an embodiment, the state controller implementation may comprise generating a set of instructions for processing one or more events initiated by either the user or the HMI application 104.

Figure 5:
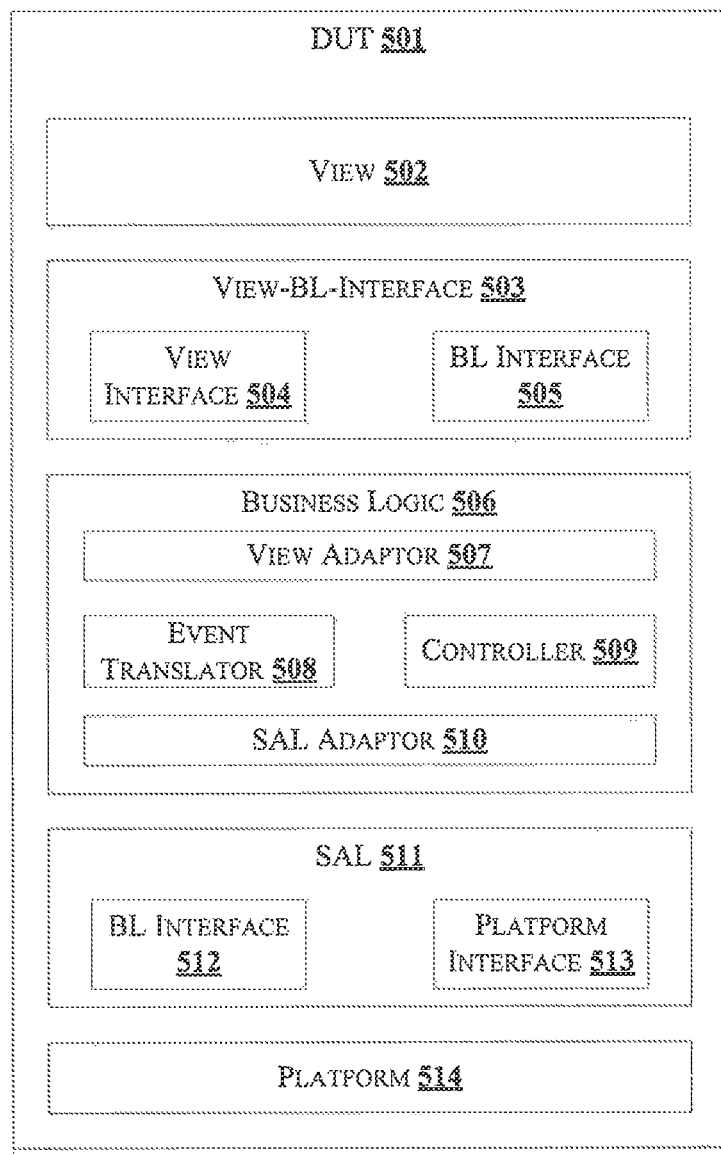
FIG. 5 shows an exemplary block diagram of a Device Under Test (DUT) for integrating a business logic database, in accordance with some embodiments of the present disclosure.

FIG. 5, shows an exemplary block diagram of a Device Under Test (DUT) 501 for integrating a business logic database, in accordance with some embodiments of the present disclosure. The DUT 501 comprises the view 502, a view-BL-interface (VBI) 503, a view interface 504, a BL interface 505, a business logic 506, a View Adaptor (VA) 507, an event translator 508, a controller 509, a SAL adaptor 510, a SAL 511, a BL interface 512, the platform interface 513 and a platform 514. In an embodiment, the BL interface 505 may be an interface between the view 502 and the BL, and the BL interface 512 may be an interface between the BL and the view 502.

In an embodiment, the view 502 represents a thin client for realizing a HMI screen. The view 502 may comprise the VBI 503 and the BL 506.

In an embodiment, VBI 503 may decouple the view 502 from BL. The VBI 503 may use an Extensible Mark-up Language (XBL) based schema to define the interface between view client and the BL 506.

In an embodiment, the BL 506 in the DUT 501 may include the VA 507, the SAL adaptor 510 and the event translator 508. The VA 507 may be responsible for communication of the DUT 501 with the view 502 via the VBI503.

In an embodiment, the SAL adaptor 510 may be responsible for communication of the DUT 501 with a target platform via the SAL 511.

In an embodiment, the event translator 508 may be responsible for analyzing the user-initiated events received from the view 502 and the HMI application 104 initiated events received from SAL 511. The event translator 508 may further translate the events into logical events for further processing by the controller 509.

In an embodiment, the controller 509 may be responsible for querying the BL DB 103 and may implement the BL 506 based on the logical events. In an embodiment, the SAL 511 may de-couple the BL from the platform 514.

In an embodiment, the updated data in the BL DB 103 may be independently tested. A test case may be developed for the updated BL data alone.

In an embodiment the present disclosure discloses a method and a system for developing a BL DB 103 from the BL specification 205. Thus, the BL DB 103 may be updated as and when the BL data in the BL specification 205 is updated.

In an embodiment, the present disclosure discloses a method and a system for de-coupling the BL from the HMI application 104. Thus, the view 502 may not be dependent on the changes made in the BL data. Also, the development complexity of the view 502 according to changes in the BL data is reduced.

In an embodiment, the BL data in the BL DB 103 may be independently tested. Thus, the testing procedure is simple, and the resources and cost associated with the testing also decreases.

Computer System

Figure 6:
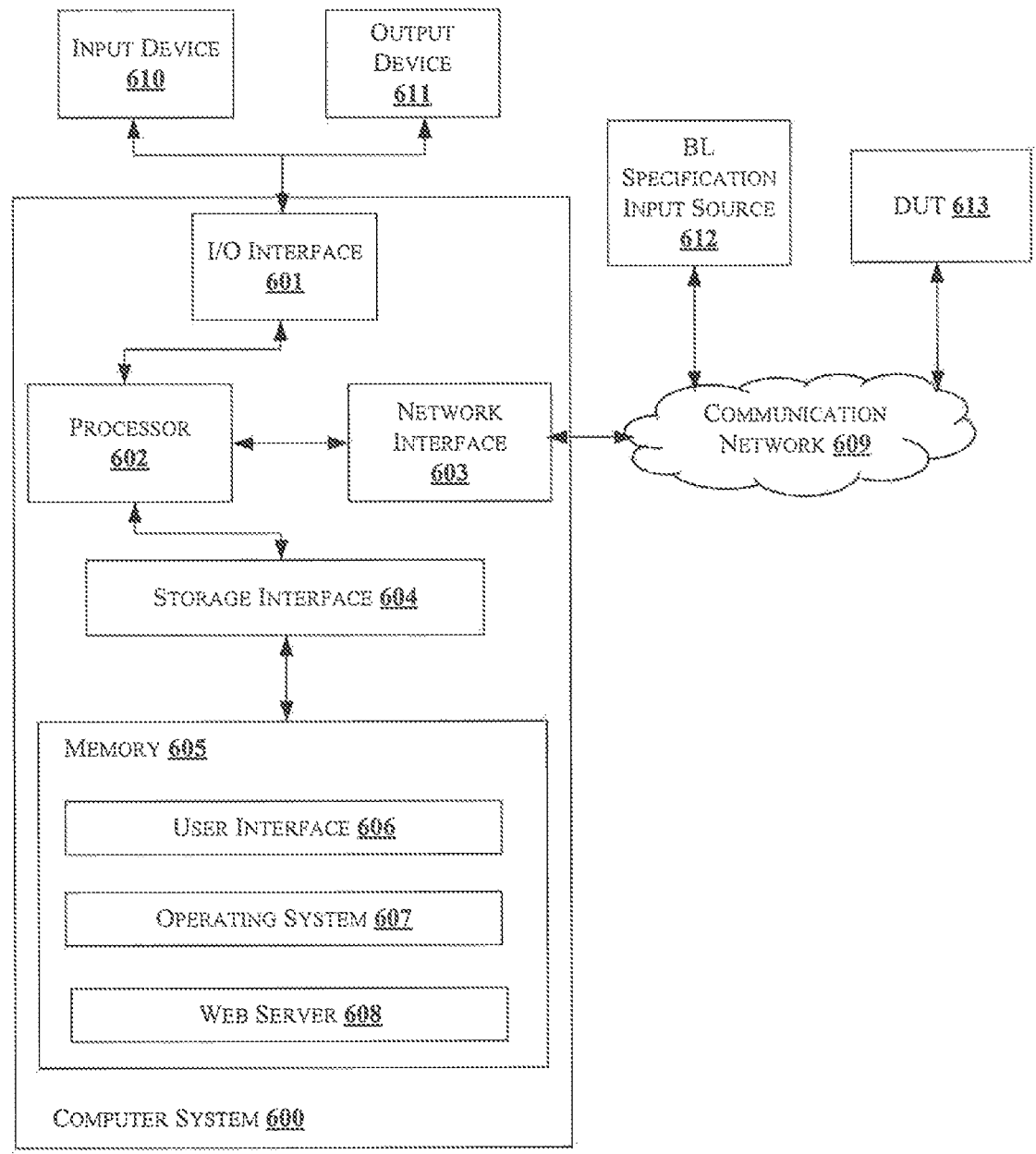
FIG. 6 shows a block diagram of a general-purpose computer system for integrating a business logic database with a Human Machine Interface (HMI), in accordance with some embodiments of the present disclosure.

FIG. 6 illustrates a block diagram of an exemplary computer system 600 for implementing embodiments consistent with the present disclosure. In an embodiment, the computer system 600 is used to integrate the BL DB 103 with the HMI application 104. The computer system 600 may comprise a central processing unit ("CPU" or "processor") 602. The processor 602 may comprise at least one data processor for integrating the BL DB 103 with the HMI application 104. The processor 602 may include specialized processing units such as integrated system (bus) controllers, memory management control units, floating point units, graphics processing units, digital signal processing units, etc.

The processor 602 may be disposed in communication with one or more input/output (I/O) devices (not shown) via I/O interface 601. The I/O interface 601 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n /b/g/n/x, Bluetooth, cellular (e.g., code-division multiple access (CDMA), high-speed packet access (HSPA+), global system for mobile communications (GSM), long-term evolution (LTE), WiMax, or the like), etc.

Using I/O interface 601, the computer system 600 may communicate with one or more I/O devices. For example, the input device 610 may be an antenna, keyboard, mouse, joystick, (infrared) remote control, camera, card reader, fax machine, dangle, biometric reader, microphone, touch screen, touchpad, trackball, stylus, scanner, storage device, transceiver, video device/source, etc. The output device 611 may be a printer, fax machine, video display (e.g., cathode ray tube (CRT), liquid crystal display (LCD), light-emitting diode (LED), plasma, Plasma display panel (PDP), Organic light-emitting diode display (OLED) or the like), audio speaker, etc.

In some embodiments, the computer system 600 is connected to the BL specification input sources 612 and the DUT 613 through a communication network 609. The processor 602 may be disposed in communication with the communication network 609 via a network interface 603. The network interface 603 may communicate with the communication network 609. The network interface 603 may employ connection protocols including, without limitation, direct connect, Ethernet (e.g., twisted pair 10/100/1000 Base T), transmission control protocol/internee protocol (TCP/IP), token ring, IEEE 802.11a/b/g/n/x, etc. The communication network 609 may include, without limitation, a direct interconnection, local area network (LAN), wide area network (WAN), wireless network (e.g., using Wireless Application Protocol), the Internet, etc. Using the network interface 603 and the communication network 609, the computer system 600 may communicate with the BL specification input sources 612 and the DUT 613. The network interface 603 may employ connection protocols include, but not limited to, direct connect, Ethernet (e.g., twisted pair 10/100/1000 Base T), transmission control protocol/internet protocol (TCP/IP), token ring, IEEE 802.11a/b/g/n/x, etc.

The communication network 609 includes, but is not limited to, a direct interconnection, an e-commerce network, a peer to peer (P2P) network, local area network (LAN), wide area network (WAN), wireless network (e.g., using Wireless Application Protocol), the Internet, Wi-Fi and such. The first network and the second network may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the first network and the second network may include a variety of network devices, including routers, bridges, servers, computing devices, storage devices, etc.

In some embodiments, the processor 602 may be disposed in communication with a memory 605 (e.g., RAM, ROM, etc. not shown in FIG. 6) via a storage interface 604. The storage interface 604 may connect to memory 605 including, without limitation, memory drives, removable disc drives, etc., employing connection protocols such as serial advanced technology attachment (SATA), Integrated Drive Electronics (IDE), IEEE-1394, Universal Serial Bus (USB), fiber channel, Small Computer Systems interface (SCSI), etc. The memory drives may further include a drum, magnetic disc drive, magneto-optical drive, optical drive, Redundant Array of Independent Discs (RAID), solid-state memory devices, solid-state drives, etc.

The memory 605 may store a collection of program or database components, including, without limitation, user interface 606, an operating system 607, web server 608 etc. In some embodiments, computer system 600 may store user/application data 606, such as, the data, variables, records, etc., as described in this disclosure. Such databases may be implemented as fault-tolerant, relational, scalable, secure databases such as Oracle® or Sybase®.

The operating system 607 may facilitate resource management and operation of the computer system 600. Examples of operating systems include, without limitation, APPLE MACINTOSH® OS X, UNIX®, UNIX-like system distributions (E. G., BERKELEY SOFTWARE DISTRIBUTION™ (BSD), FREEBSD™, NETBSD™, OPENBSD™, etc.), LINUX DISTRIBUTIONS™ (E. G., RED HAT™, UBUNTU™, KUBUNTU™, etc.), IBM™ OS/2. MICROSOFT™ WINDOWS™ (XP™, VISTA™/7/8, 10 etc.), APPLE® IOS™, GOOGLE® ANDROID™, BLACKBERRY® OS, or the like.

In some embodiments, the computer system 600 may implement a web browser 608 stored program component. The web browser 608 may be a hypertext viewing application, for example MICROSOFT® INTERNET EXPLORER™, GOOGLE® CHROME™, MOZILLA® FIREFOX™, APPLE® SAFARI™, etc. Secure web browsing may be provided using Secure Hypertext Transport Protocol (HTTPS), Secure Sockets Layer (SSL), Transport Layer Security (TLS), etc. Web browsers 608 may utilize facilities such as AJAX™, DHTML™, ADOBE® FLASH™, JAVASCRIPT™, JAVASCRIPT™, Application Programming Interfaces (APIs), etc. In some embodiments, the computer system 600 may implement a mail server stored program component. The mail server may be an Internet mail server such as Microsoft Exchange, or the like. The mail server may utilize facilities such as ASP™, ACTIVEX™, ANSI™ C++/C#, MICROSOFT®, .NET™, CGI SCRIPTS™, JAVA™, JAVASCRIPT™, PERL™, PHP™, PYTHON™, WEBOBJECTS™, etc. The mail server may utilize communication protocols such as Internet Message Access Protocol (IMAP), Messaging Application Programming Interface (MAPI), MICROSOFT™ exchange, Post Office Protocol (POP), Simple Mail Transfer Protocol (SMTP), or the like. In some embodiments, the computer system 600 may implement a mail client stored program component. The mail client may be a mail viewing application, such as APPLE® MAIL™, MICROSOFT® ENTOURAGE™, MICROSOFT® OUTLOOK™, MOZILLA® THUNDERBIRD™, etc.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include Random Access Memory (RAM), Read-Only Memory (ROM), volatile memory, non-volatile memory, hard drives, CD ROMs, DVDs, flash drives, disks, and any other known physical storage media.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise. The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 3 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERRAL NUMERALS

| Reference number | Description |
| --- | --- |
| 100 | BL DB development environment |
| 101 | BL specification input source |
| 102 | BL DB development tool |
| 103 | BL DB |

-continued

| Reference number | Description |
| --- | --- |
| 104 | HMI application |
| 201 | I/O interface |
| 202 | Memory |
| 203 | Processor |
| 204 | Data |
| 205 | BL specification |
| 206 | Other data |
| 207 | Modules |
| 208 | Communication module |
| 209 | State chart generator |
| 210 | BL DB generator |
| 211 | BL DB updater |
| 212 | BL DB integrator |
| 213 | Other modules |
| 501 | DUT |
| 502 | View |
| 503 | VBI |
| 504 | View interface |
| 505 | BL interface |
| 506 | BL |
| 507 | View adaptor |
| 508 | Event translator |
| 509 | Controller |
| 510 | SAL adaptor |
| 511 | SAL |
| 512 | BL interface |
| 513 | Platform interface |
| 514 | Platform |
| 600 | Computer system |
| 601 | I/O interface |
| 602 | Processor |
| 603 | Network interface |
| 604 | Storage interface |
| 605 | Memory |
| 606 | User interface |
| 607 | Operating system |
| 608 | Web service |
| 609 | Communication network |
| 610 | Input device |
| 611 | Output device |
| 612 | BL specification input source |
| 613 | DUT |

What is claimed is:

1. A method for integrating a dynamic Business Logic (BL) Database (DB) with a Human Machine Interface (HMI) application, the method comprising:
receiving, by a Database (DB) development tool, a Business Logic (BL) specification from one or more BL input sources, wherein the BL specification comprises BL data and one or more parameters associated with the BL data;
generating, by the DB development tool, one or more state charts of the BL data from the BL specification;
developing, by the DB development tool, a dynamic BL DB based on the one or more parameters and the one or more state charts, wherein the dynamic BL DB comprises the BL data of the BL specification, wherein the BL data comprises data associated with a logic of the HMI application and a logic of a view of the HMI application;
updating, by the DB development tool, the BL data in the dynamic BL DB when the BL data in the BL specification is updated;
testing, by the DB development tool, the dynamic BL DB, wherein the testing comprises performing an independent test on updated BL data; and
integrating, by the DB development tool, the dynamic BL DB with the HMI application utilizing the BL data to implement the BL, wherein the HMI application retrieves the updated BL data from the dynamic BL DB for implementing updated BL, wherein integrating further comprises integrating the dynamic BL DB with the HMI application with a predefined view, wherein the predefined view is decoupled from the BL, and wherein the HMI application retrieves the updated BL data without affecting the predefined view of the HMI application, and wherein integrating the dynamic BL DB with the HMI application comprises event translation, business function implementation, and state controller generation, wherein the business function implementation is performed using a guard function, an action function, and a state function, and wherein the guard function is implemented using a platform interface that uses data from a data pool associated with the HMI application.

2. The method of claim 1, wherein the BL specification is in a BL specification format.

3. The method of claim 1, wherein the one or more state charts are generated using a modeling tool, wherein each of the one or more state charts comprises a plurality of state transitions indicating the BL.

4. The method of claim 1, wherein the dynamic BL DB is updated using one or more queries, and wherein each of the one or more queries is configured to perform an action.

5. The method of claim 4, wherein the action comprises at least one of an entry function, an exit function, a do function, and a transition function.

6. The method of claim 1, wherein the one or more parameters comprises at least one of a control logic for controlling a view of the HMI application and behavior of the HMI application based on one or more events, wherein the one or more parameters are controlled based on events triggered by at least one of a user, the BL DB development tool, cost associated in implementing the BL, and complexity in implementing the BL.

7. A dynamic Business Logic (BL) Database (DB) development tool for integrating with a Human Machine Interface (HMI) application, comprising:
a processor; and
a memory, communicatively coupled with the processor, which stores processor executable instructions, which on execution causes the processor to:
receive a Business Logic (BL) specification from one or more BL input sources, wherein the BL specification comprises BL data and one or more parameters associated with the BL data;
generate one or more state charts of the BL data from the BL specification;
develop a dynamic BL DB based on the one or more parameters and the one or more state charts, wherein the dynamic BL DB comprises the BL data of the BL specification, wherein the BL data comprises data associated with a logic of the HMI application and a logic of a view of the HMI application; update the BL data in the dynamic BL DB when the BL data in the BL specification is updated;
test the dynamic BL DB, wherein the testing comprises performing an independent test on the updated BL data; and
integrate the dynamic BL DB with the HMI application utilizing the BL data to implement the BL, wherein the HMI application retrieves the updated BL data from the dynamic BL DB for implementing updated BL, the processor executable instructions, further causes the processor to integrate the dynamic BL DB with the HMI application with a predefined view, wherein the predefined view is decoupled from the BL, and wherein the HMI application retrieves the updated BL data without affecting the predefined view of the HMI application, and wherein integrating the dynamic BL DB with the HMI application comprises event translation, business function implementation, and state controller generation, wherein the business function implementation is performed using a guard function, an action function, and a state function, and wherein the guard function is implemented using a platform interface that uses data from a data pool associated with the HMI application.

8. The dynamic BL DB of claim 7, wherein the BL specification is in a BL specification format.

9. The dynamic BL DB of claim 7, wherein the one or more state charts are generated using a modeling tool, wherein each of the one or more state charts comprises a plurality of state transitions indicating the BL.

10. The dynamic BL DB of claim 7, wherein the dynamic BL DB is updated using one or more queries, and wherein each of the one or more queries is configured to perform an action.

11. The dynamic BL DB of claim 10, wherein the action comprises at least one of an entry function, an exit function, a do function, and a transition function.

12. The dynamic BL DB of claim 7, wherein the one or more parameters comprises at least one of a control logic for controlling a view of the HMI application and behavior of the HMI application based on one or more events, wherein the one or more parameters are controlled based on events triggered by at least one of a user, the BL DB development tool, cost associated in implementing the BL, and complexity in implementing the BL.

13. A non-transitory computer readable medium including instructions stored thereon that when processed by at least one processor cause a device to perform operations comprising:
  receiving a Business Logic (BL) specification from one or more BL input sources, wherein the BL specification comprises BL data and one or more parameters associated with the BL data;
  generating one or more state charts of the BL data from the BL specification;
  developing a dynamic BL DB based on the one or more parameters and the one or more state charts, wherein the dynamic BL DB comprises the BL data of the BL specification, wherein the BL data comprises data associated with a logic of the HMI application and a logic of a view of the HMI application;
  updating the BL data in the dynamic BL DB when the BL data in the BL specification is updated;
  test the dynamic BL DB, wherein the testing comprises performing an independent test on the updated BL data; and
  integrating the dynamic BL DB with the HMI application utilizing the BL data to implement the BL, wherein the HMI application retrieves the updated BL data from the dynamic BL DB for implementing updated BL, wherein integrating further comprises integrating the dynamic BL DB with the HMI application with a predefined view, wherein the predefined view is decoupled from the BL, and wherein the HMI application retrieves the updated BL data without affecting the predefined view of the HMI application, and wherein integrating the dynamic BL DB with the HMI application comprises event translation, business function implementation, and state controller generation, wherein the business function implementation is performed using a guard function, an action function, and a state function, and wherein the guard function is implemented using a platform interface that uses data from a data pool associated with the HMI application.

14. The non-transitory computer readable medium of claim 13, wherein the BL specification is in a BL specification format.

15. The non-transitory computer readable medium of claim 13, wherein the one or more state charts are generated using a modeling tool, wherein each of the one or more state charts comprises a plurality of state transitions indicating the BL.

16. The non-transitory computer readable medium of claim 13, wherein the dynamic BL DB is updated using one or more queries, and wherein each of the one or more queries is configured to perform an action.

17. The non-transitory computer readable medium of claim 16, wherein the action comprises at least one of an entry function, an exit function, a do function, and a transition function.

18. The non-transitory computer readable medium of claim 13, wherein the one or more parameters comprises at least one of a control logic for controlling a view of the HMI application and behavior of the HMI application based on one or more events, wherein the one or more parameters are controlled based on events triggered by at least one of a user, the BL DB development tool, cost associated in implementing the BL, and complexity in implementing the BL.

* * * * *